(12) United States Patent
Inaba et al.

(10) Patent No.: US 8,061,379 B2
(45) Date of Patent: Nov. 22, 2011

(54) MANIFOLD SOLENOID VALVE

(75) Inventors: Jouji Inaba, Tokyo (JP); Kazuya Okamoto, Tokyo (JP)

(73) Assignee: Koganei Corporation, Tokyo (JP)

( * ) Notice: Subject to any disclaimer, the term of this patent is extended or adjusted under 35 U.S.C. 154(b) by 445 days.

(21) Appl. No.: 12/392,210

(22) Filed: Feb. 25, 2009

(65) Prior Publication Data

US 2009/0212247 A1 Aug. 27, 2009

(30) Foreign Application Priority Data

Feb. 26, 2008 (JP) ................................ 2008-044490

(51) Int. Cl.
*F15B 13/00* (2006.01)
(52) U.S. Cl. ..................... 137/271; 137/884; 137/625.64
(58) Field of Classification Search .................. 137/269, 137/271, 884, 625.64, 625.66, 625.69, 625.25, 137/625.67
See application file for complete search history.

(56) References Cited

U.S. PATENT DOCUMENTS

| | | | |
|---|---|---|---|
| 5,868,157 A * | 2/1999 | Yoshimura et al. | 137/269 |
| 5,983,921 A | 11/1999 | Miyazoe et al. | |
| 5,996,609 A * | 12/1999 | Akimoto et al. | 137/270 |
| 6,109,291 A * | 8/2000 | Yoshimura | 137/269 |
| 6,109,298 A * | 8/2000 | Kaneko et al. | 137/551 |
| 6,142,182 A * | 11/2000 | Akimoto | 137/625.64 |

FOREIGN PATENT DOCUMENTS

| | | |
|---|---|---|
| JP | 3189487 A | 8/1991 |
| JP | 2679934 | 11/1997 |
| JP | 10-54473 | 2/1998 |
| JP | 10089517 A | 4/1998 |
| JP | 11-141712 | 5/1999 |
| JP | 2000-274542 A | 10/2000 |

OTHER PUBLICATIONS

The Notification of Reasons for Rejection issued on Jul. 20, 2010, with English translation.

* cited by examiner

*Primary Examiner* — Craig Schneider
(74) *Attorney, Agent, or Firm* — McCormick, Paulding & Huber LLP

(57) ABSTRACT

A plurality of valve assemblies are provided to a base, and an air-supply flow path for supplying compressed air to each valve assembly is formed in the base. A main flow path communicating with the air-supply flow path and communicating with a pilot air-supply flow path is formed in an air supply block. When the compressed air is supplied to the air-supply flow path and the pilot air-supply flow path from the main flow path, a manifold solenoid valve becomes an internal pilot type. An external pilot flow path communicating with the pilot air-supply flow path is formed in an external pilot block, and when the external pilot block is provided, communication between the main flow path and the pilot air-supply flow path is shut off, and the manifold solenoid valve becomes an external pilot type in which the pilot pressure is supplied from the external pilot flow path.

7 Claims, 11 Drawing Sheets

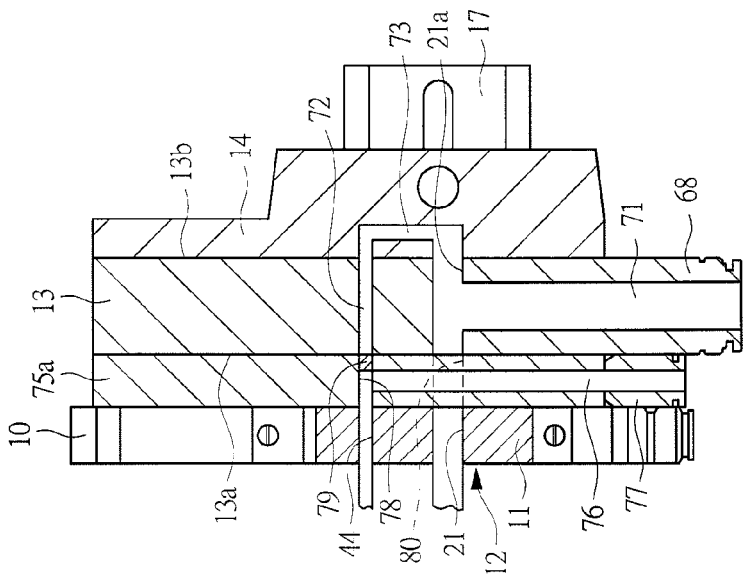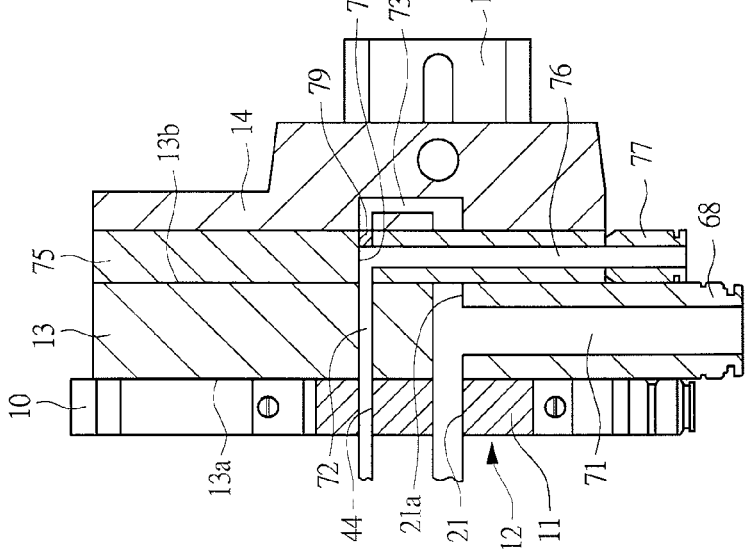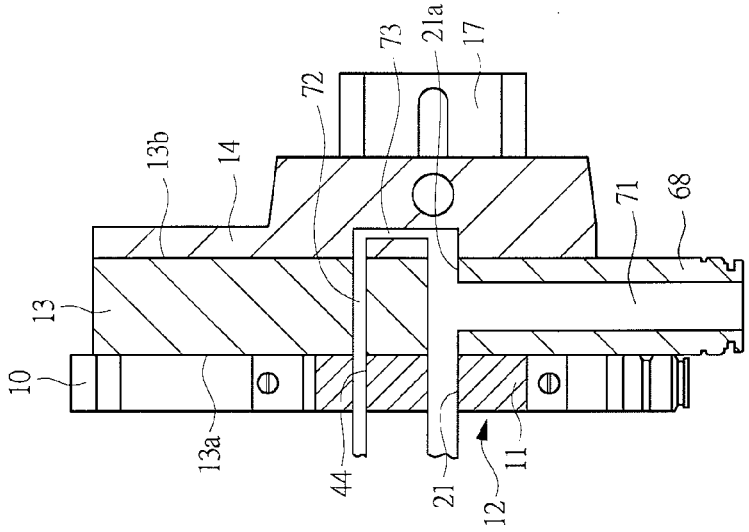

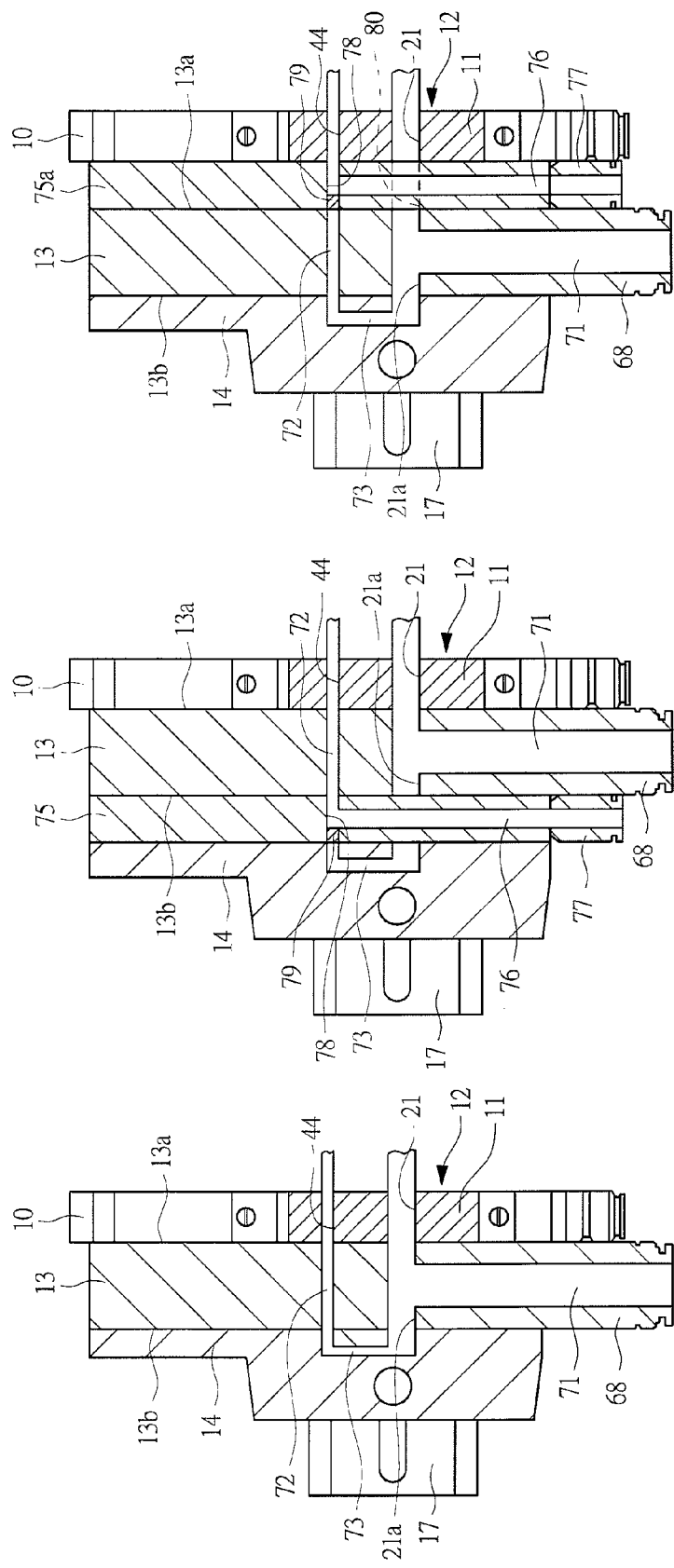

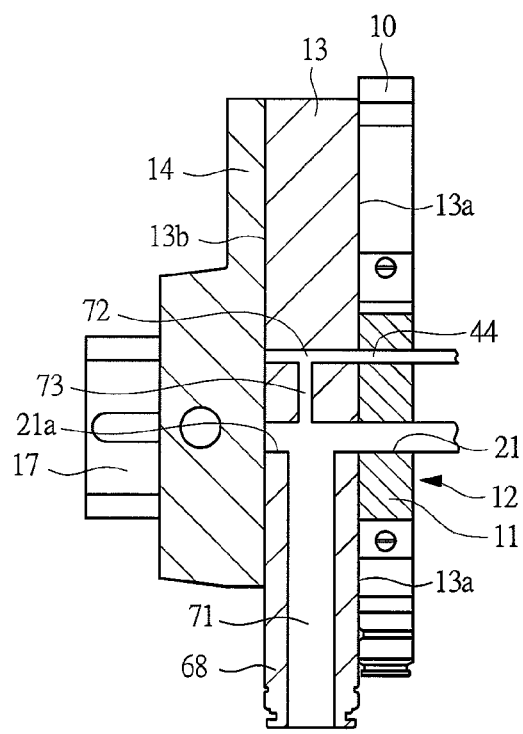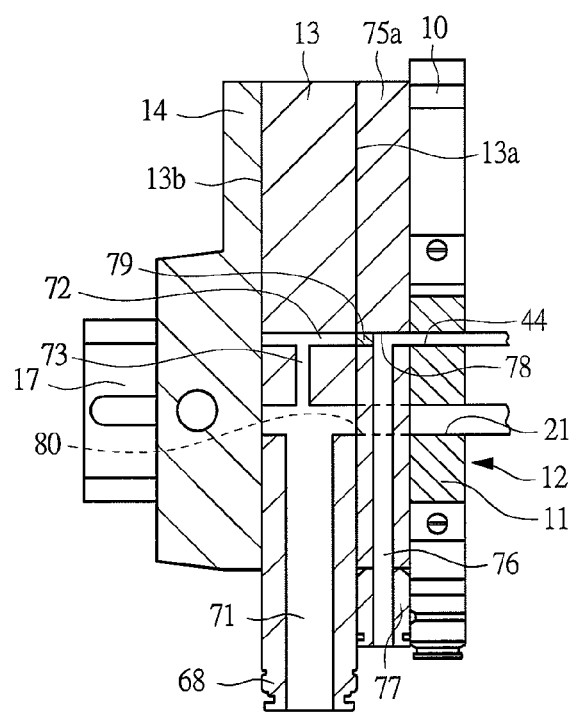

MANIFOLD SOLENOID VALVE

CROSS-REFERENCE TO RELATED APPLICATIONS

Applicant hereby claims foreign priority benefits under U.S.C. §119 from Japanese Patent Application No. 2008-44490 filed on Feb. 26, 2008, the contents of which are incorporated by reference herein.

TECHNICAL FIELD OF THE INVENTION

The present invention relates to a manifold solenoid valve in which a plurality of valve assemblies each having a pilot solenoid valve are arranged in a base, and particularly to a manifold solenoid valve which can be set to any of an internal pilot type and an external pilot type.

BACKGROUND OF THE INVENTION

When a plurality of solenoid valves are collectively attached to a manifold for use, a manifold solenoid valve is used. The "manifold" is also called a "manifold base" or simply a "base". The base is provided with a common air-supply flow path for supplying compressed air to each solenoid valve, and a common exhaust flow path for exhausting, to the outside, the compressed air that has been exhausted from each solenoid valve. An indirect actuating type solenoid valve activated by pilot pressure has a spool valve shaft for switching the flow path, and a pilot solenoid valve in which pilot pneumatic pressure for driving the spool valve shaft is supplied and controlled to the spool valve shaft. Accordingly, a valve assembly is formed by the spool valve shaft and the pilot solenoid valve. Regarding the manifold solenoid valve in which the valve assembly is collectively connected to the base, formed in the base are a common pilot air-supply flow path for supplying pilot pressure to each pilot solenoid valve, and a common pilot exhaust flow path for exhausting the pilot pressure to the outside. The base of the manifold solenoid valve includes a divided type, and the divided type base is formed by connecting a plurality of base modules to each of which the valve assembly is attached.

The manifold solenoid valve mentioned above includes an internal pilot type and an external pilot type. The internal pilot type has a structure of: being branched from the common air-supply flow path of the base to supply, to the pilot air-supply flow path, part of the compressed air in the air-supply flow path; and supplying the compressed air in the air-supply flow path to the pilot solenoid valve. The external pilot type has a structure of: directly supplying the pilot pressure to the pilot flow path from the outside; and supplying the compressed air to the pilot solenoid valve from the outside. In the external pilot type, pressure different from pressure supplied to the air-supply flow path can be supplied as pilot pressure to move the spool valve shaft.

The manifold solenoid valve, in which an actuating mode of the pilot solenoid valve is switched to any of the internal and external pilot types, is described in Patent Document 1 (Japanese Patent Application Laid-Open Publication No. 11-141712), Patent Document 2 (Japanese Patent No. 2679934), and Patent Document 3 (Japanese Patent Application Laid-Open Publication No. 10-54473).

SUMMARY OF THE INVENTION

In a conventional manifold solenoid valve, an internal pilot switching member and an external pilot switching member are selectively attached to a half-finished product having a common structure to the internal and external pilot types. If the internal pilot switching member is attached, the compressed air in the common air-supply flow path is supplied as pilot pressure to the pilot air-supply flow path. On the other hand, if the external pilot switching member is attached, the pilot pressure supplied to this switching member from the outside is supplied to the pilot air-supply flow path.

As described above, if the manifold solenoid valve is switched to the internal and external pilot types by using the switching members exclusive for the internal and external pilot types, it is necessary to manufacture each of the switching members, and the number of parts is increased. Accordingly, it becomes complicated to manufacture the manifold solenoid valve and manage the parts.

An object of the present invention is to be able to set a manifold solenoid valve to internal and external pilot types by using a less number of parts.

The other object of the present invention is to be able to easily set the manifold solenoid valve to the external pilot type from the internal pilot type used as a standard specification.

A manifold solenoid valve according to the present invention has a plurality of valve assemblies, each being provided with a spool valve shaft, which is movable to a position of causing an air supply port to communicate with an output port and a position of causing the output port to communicate with an exhaust port, and with a pilot solenoid valve, which is switched to a position of supplying pilot pressure to the spool valve shaft and a position of stopping the supply, the manifold solenoid valve comprising: a base, on which each of the valve assemblies is mounted and in which a common air-supply flow path communicating with the air supply port, a common exhaust flow path communicating with the exhaust port, and a common pilot air-supply flow path supplying the pilot pressure to the pilot solenoid valve are formed; and an air supply block, in which a main flow path communicating with the air-supply flow path, and an internal pilot flow path communicating with the pilot air-supply flow path are formed and which is detachably connected to the base, wherein the air supply block is provided with a mounting surface, to which an external pilot block is detachably connected, an external pilot flow path communicating with the pilot air-supply flow path being formed in the external pilot block, and the external pilot block shutting off communication between the pilot air-supply flow path and the main flow path, and the pilot solenoid valve is permitted to be set to any of an internal pilot type of supplying the pilot pressure to the pilot air-supply flow path via the main flow path, and an external pilot type of supplying the pilot pressure to the pilot air-supply flow path via the external pilot flow path of the external pilot block by adding on the external pilot block to the air supply block.

The manifold solenoid valve according to the present invention is such that: when the pilot solenoid valve is set to the internal pilot type, an end block is connected to the air supply block connected to the base; when the pilot solenoid valve is set to the external pilot type, the end block is connected to the external pilot block, which is connected to the air supply block connected to the base; and when the pilot solenoid valve is set to the internal pilot type, a communication flow path causing the main flow path and the internal pilot flow path to communicate with each other is formed in the end block.

The manifold solenoid valve according to the present invention is such that: when the pilot solenoid valve is set to the internal pilot type, an end block is connected to the air supply block connected to the base; when the pilot solenoid valve is set to the external pilot type, the external pilot block is disposed between the base and the air supply block; and a through hole communicating with the main flow path and the air-supply flow path is formed in the external pilot block, and under a state where the pilot solenoid valve is set to the internal pilot type, a communication flow path causing the main flow path and the internal pilot flow path to communicate with each other is formed in the end block.

The manifold solenoid valve according to the present invention is such that: when the pilot solenoid valve is set to the internal pilot type, the air supply block is connected to the base; when the pilot solenoid valve is set to the external pilot type, the external pilot block is disposed between the base and the air supply block; and a through hole communicating with the main flow path and the air-supply flow path is formed in the external pilot block, and a communication flow path causing the main flow path and the internal pilot flow path to communicate with each other is formed in the air supply block.

The manifold solenoid valve according to the present invention is such that: a communication hole is formed by a through hole formed in the external pilot block correspondingly to the pilot air-supply flow path so as to be opened to both surfaces of the external pilot block, and by a seal member selectively detachably connected to one of both opening end portions of the through hole so as to close the one opening end portion of the through hole; and the external pilot block is permitted to be disposed at any of both end portions of the base by changing a mounting position of the seal member.

According to the manifold solenoid valve of the present invention, by adding on the external pilot block to the internal pilot type manifold solenoid valve, the communication between the main flow path and the pilot air-supply flow path is shut off, and the manifold solenoid valve can be set to the external pilot type of supplying the pilot pressure directly to the pilot air-supply flow path from the outside via the external pilot flow path. Accordingly, by adding on the external pilot block to the internal pilot type manifold solenoid valve, the manifold solenoid valve can be easily set to the external pilot type. As mentioned above, by using the internal pilot type as a standard specification and by adding the external pilot block to the internal pilot type, the manifold solenoid valve can be set to the external pilot type, so that the manifold solenoid valve can be set to any of the internal pilot type and the external pilot type by preparing the single external pilot block. On the contrary, when the external pilot block is detached from the external pilot type manifold solenoid valve, the manifold solenoid valve is set to the internal pilot type. Accordingly, use of a less number of parts permits the manifold solenoid valve to be set to any of the internal pilot type and the external pilot type, which results in facilitating manufacture of the manifold solenoid valve and management of the parts.

BRIEF DESCRIPTION OF THE DRAWINGS

FIG. 5A is a sectional view schematically showing a main portion of FIG. 2A;

FIG. 5B is a sectional view schematically showing a main portion of FIG. 2B;

FIG. 5C is a sectional view schematically showing a main portion of a modification of the manifold solenoid valve;

FIG. 9A is a sectional view schematically showing a main portion of a modification of the manifold solenoid valve illustrated in FIG. 2B;

FIG. 9B is a sectional view schematically showing a main portion of a modification of the manifold solenoid valve illustrated in FIG. 2B;

FIG. 9C is a sectional view schematically showing a main portion of a modification of the manifold solenoid valve illustrated in FIG. 2B;

FIG. 13A is a sectional view schematically showing a main portion of a modification of the manifold solenoid valve shown in FIG. 10; and FIG. 13B is a sectional view schematically showing a main portion of a modification of the manifold solenoid valve shown in FIG. 10.

DESCRIPTION OF THE PREFERRED EMBODIMENTS

Hereinafter, embodiments according to the present invention will be detailed based on the accompanying drawings.

Figure 1:
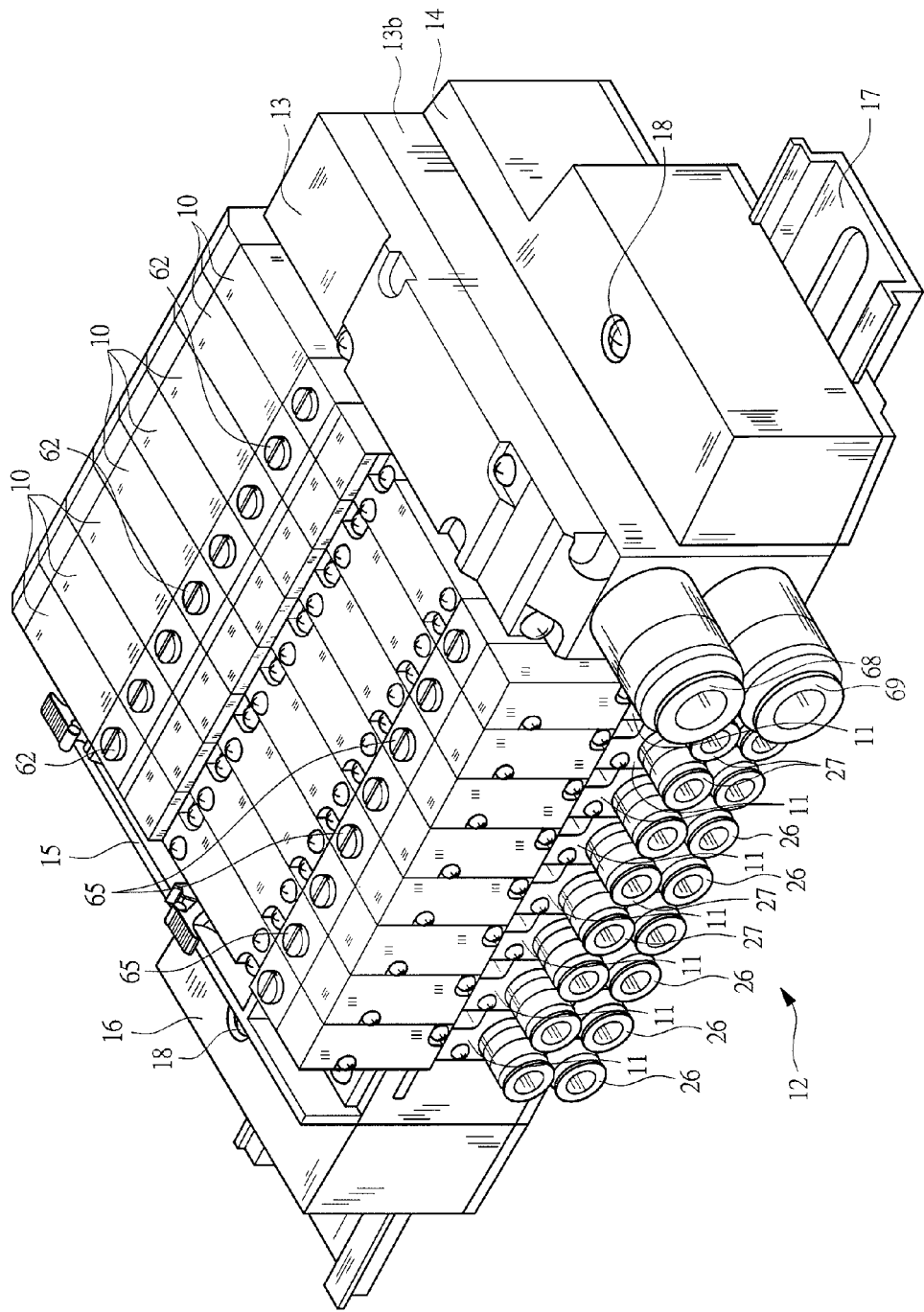
FIG. 1 is a perspective view of a manifold solenoid valve according to an embodiment of the present invention.
Figure 2A:
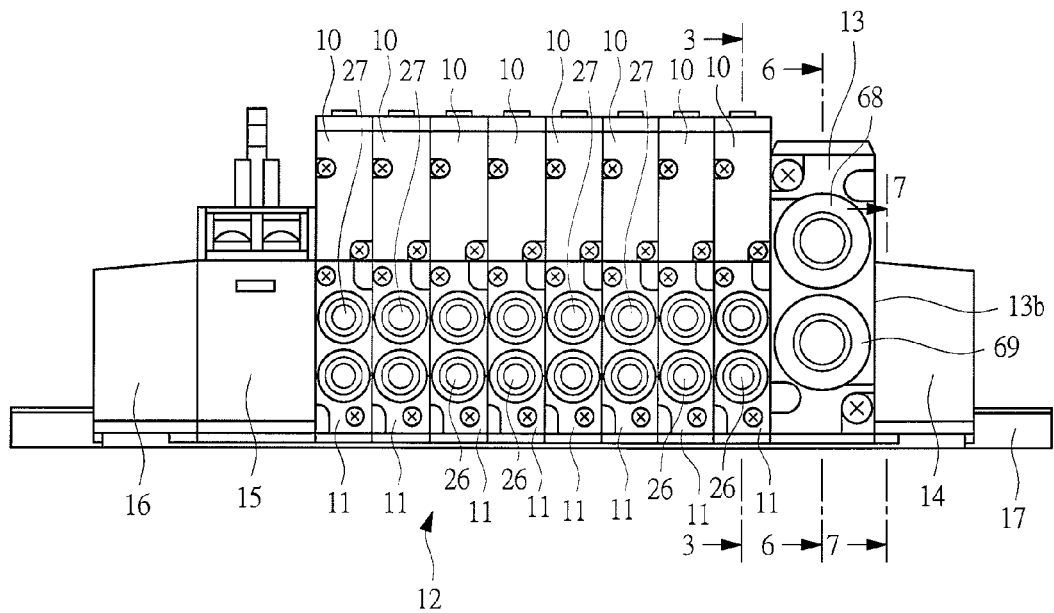
FIG. 2A is a front view of FIG. 1.

This manifold solenoid valve includes, as shown in FIGS. 1 and 2A, a plurality of valve assemblies 10, and base modules 11 to which the respective valve assemblies 10 are connected. One set of base 12 is formed by connecting the base modules 11, and the base 12 in the manifold solenoid valve is a divided type. The illustrated manifold solenoid valve has eight valve assemblies 10, but the manifold solenoid valve having any number of valve assemblies 10 may be used.

Figure 2B:
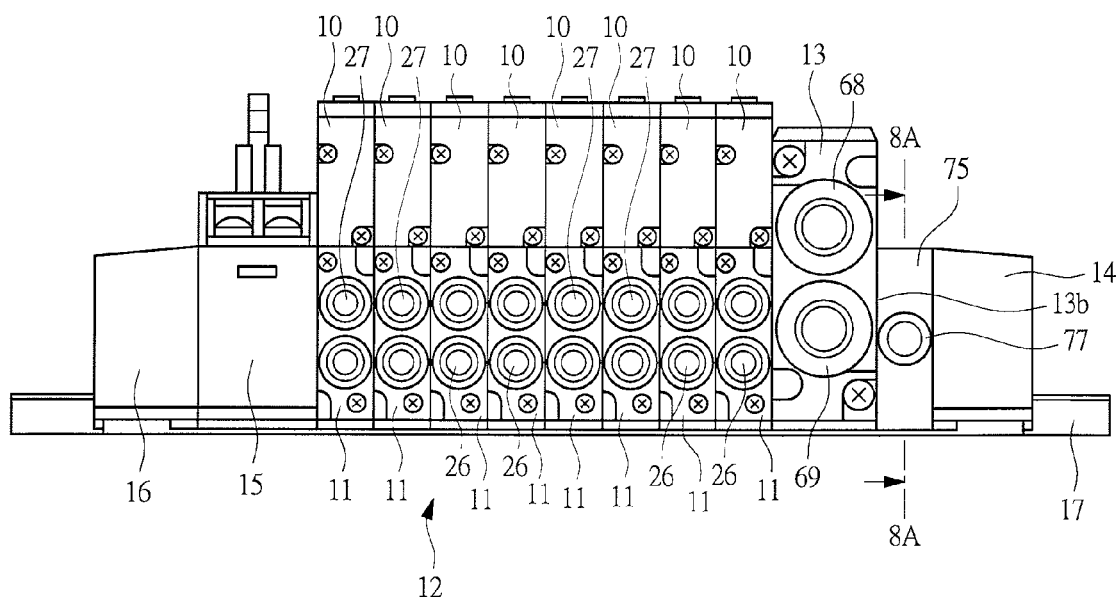
FIG. 2B is a front view showing a portion similar to that of FIG. 2A in the manifold solenoid valve switched to an eternal pilot type.

An air supply block 13 is connected to (struck to and mounted on) one end surface (right end surface in FIG. 2) of the base 12, and an end block 14 is connected to an outer surface of the air supply block 13. A wiring block 15 is connected to (mounted on) the other end surface of the base 12, and an end block 16 is connected to an outer surface of the wiring block 15. The base 12, and the air supply block 13, wiring block 15, and end blocks 14 and 16, which are arranged in both ends of the base 12, are assembled to a support member 17 called a "DIN rail", and is fixed to the support member 17 by fixing screws 18 which are attached to the respective end blocks 14 and 16. At a time of replacing or adding on the valve assembly 10 together with the base module 11, the fixing screws 18 are loosened to detach the valve assembly 10 and the base module 11 from the support member 17.

Figure 3:
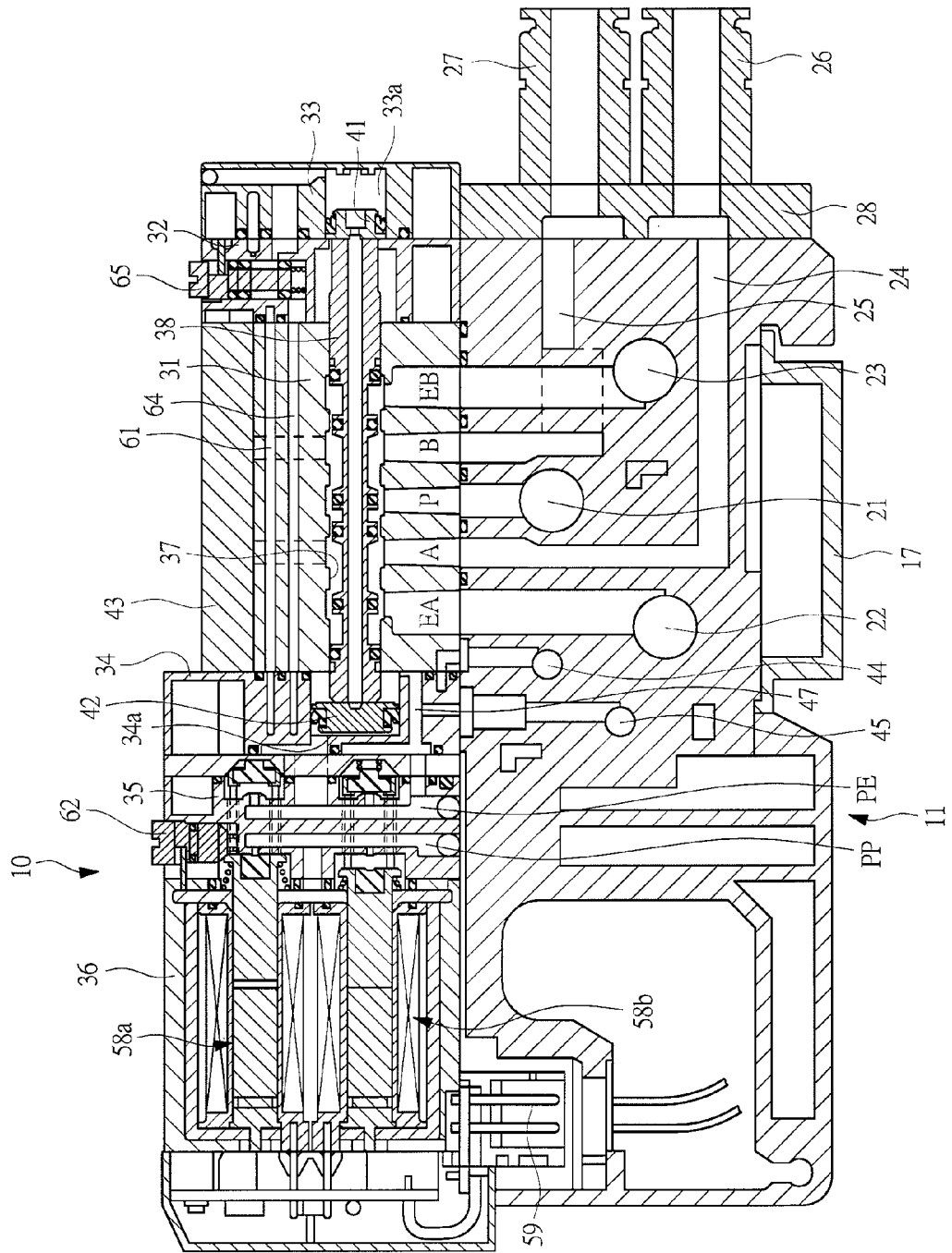
FIG. 3 is a sectional view taken along line 3-3 in FIG. 2A.
Figure 4:
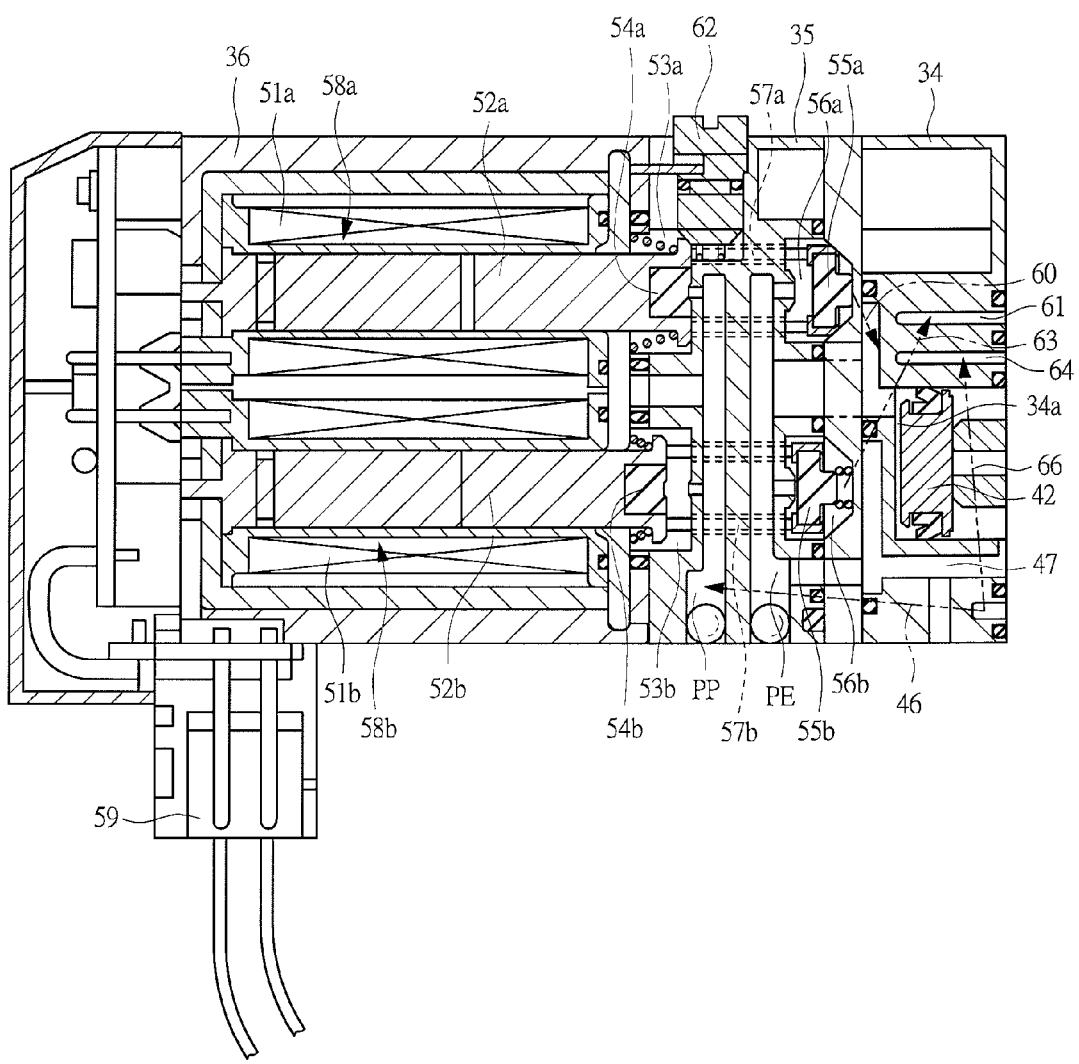
FIG. 4 is a partly enlarged sectional view in FIG. 3.

FIG. 3 is a sectional view taken along line 3-3 in FIG. 2A, and FIG. 4 is a partly enlarged sectional view of FIG. 3. As shown in FIG. 3, an air supply hole and two exhaust holes, each of which pass through each base module in a thickness direction, are formed in each base module 11. Accordingly, if the base modules 11 are connected to each other, the air supply holes are continuous with one another to form a common air-supply flow path 21 in the base 12, and the exhaust holes are continuous with each other to form common exhaust flow paths 22 and 23 in the base 12. Output flow paths 24 and 25 are formed in the respective base modules 11, and a coupling plate 28 having joints 26 and 27 that communicate with the respective output flow paths 24 and 25 is attached to an end surface of the base module 11 located on a joint connection side.

A rectangular-parallelepiped valve accommodation block 31 is attached, as shown in FIG. 3, to each of the base modules 11, and a pilot block 33 is attached to one end surface of the valve accommodation block 31 via a manual operation block 32. A pilot block 34 is attached to the other end surface of the valve accommodation block 31, and a solenoid block 36 is attached to the pilot block 34 via a manual operation block 35. The valve assembly 10 is formed by these blocks 31 to 36.

A spool valve shaft 38 is incorporated axially reciprocably into a valve hole 37 formed in the valve accommodation block 31, and pistons 41 and 42 are incorporated axially reciprocably into pilot pressure chambers 33a and 34a formed in the pilot blocks 33 and 34 so as to be positioned at both ends of the spool valve shaft 38. If pilot pressure is supplied into the pilot pressure chamber 34a, the spool valve shaft 38 is moved to a right side of FIG. 3 by the pilot pressure and reaches a first position. If the pilot pressure is supplied into the pilot pressure chamber 33a, the spool valve shaft 38 is moved in a reverse direction and reaches a second position. FIG. 3 shows a state in which the spool valve shaft 38 has reached the second position.

An air supply port "P" communicating with the air-supply flow path 21 is formed in a longitudinal-directional center portion of the valve accommodation block 31, and an output port "A" communicating with the output flow path 24 and an output port "B" communicating with the output flow path 25 are formed on both sides of the air supply port P. Exhaust ports "EA" and "EB" communicating with the respective exhaust flow paths 22 and 23 adjacently to the respective output ports A and B are formed in the valve accommodation block 31. Each of the ports communicates with the valve hole 37. The spool valve shaft 38 is provided with a plurality of valve bodies, each of which contacts with a valve seat formed in the valve hole 37. According to a position of the spool valve shaft 38, the air supply port P communicates with the one of the output ports, and the other of the output ports communicates with the exhaust port. In other words, if the pilot pressure is supplied to the pilot pressure chamber 34a, the spool valve shaft 38 reaches the first position, whereby the air supply port P and the output port A communicate with each other, and the output port B and the exhaust port EB communicate with each other. Accordingly, compressed air is supplied to a pneumatic actuator such as an air cylinder from the air-supply flow path 21 via the output flow path 24 communicating with the output port A, and the air exhausted from the pneumatic actuator is exhausted to the exhaust flow path 23 via the exhaust port EB from the output flow path 25.

Meanwhile, if pilot pressure is supplied to the pilot pressure chamber 33a, as shown in FIG. 3, the spool valve shaft 38 reaches the second position, whereby the air supply port P and the output port B communicate with each other, and the output port A and the exhaust port EA communicate with each other. Accordingly, compressed air is supplied to the pneumatic actuator such as an air cylinder from the air-supply flow path 21 via the output flow path 25 communicating with the output port B, and the air exhausted from the pneumatic actuator is exhausted to the exhaust flow path 22 from the output flow path 24 via the exhaust port EA.

As shown in FIG. 3, output ports shown by dotted lines correspondingly to the output ports A and B are formed in the valve accommodation block 31, and are each opened to a surface of the valve accommodation block 31. A seal plate 43 is attached to the surface of the valve accommodation block 31 for closing the opened output port, and if the seal plate 43 is replaced by the coupling plate 28, as shown in FIG. 3, a type of connecting the pneumatic actuator to the base module 11 is switched to a type of connecting the pneumatic actuator to the valve assembly body 10.

As shown in FIG. 3, a pilot air-supply hole and a pilot exhaust hole, which pass through each base module 11 in their respective thickness directions, are formed in the base modules 11. If the base modules 11 are connected to each other, the pilot air-supply holes are continuous with one another, whereby a common pilot air-supply flow path 44 is formed in the base 12, and the pilot exhaust holes are continuous with one another, whereby a common pilot exhaust flow path 45 is formed in the base 12. A pilot air-supply port "PP", which communicates with the pilot air-supply flow path 44 via a communication flow path 46 shown by a chain double-dashed line of FIG. 4, is formed in the manual operation block 35. A pilot exhaust port "PE" formed in the manual operation block 35 communicates with the pilot exhaust flow path 45 via a communication flow path 47.

As shown in FIG. 4, movable cores 52a and 52b are parallel to each other and connected to the solenoid block 36 so as to be axially reciprocable in respective bobbins around which coils 51a and 51b are wound. Tips portions of the movable cores 52a and 52b protrude into communication chambers 53a and 53b communicating with the pilot air-supply port PP, and the respective tip portions are provided with rubber valve bodies 54a and 54b. Flapper valves 55a and 55b are arranged in valve chambers 56a and 56b opposite the movable cores 52a and 52b, respectively, and through holes, which causes the communication chambers 53a and 53b and the valve chambers 56a and 56b to one another, are provided with interlocking rods 57a and 57b, respectively. As mentioned above, two sets of pilot solenoid valves 58a and 58b are formed by the coils 51a and 51b, the movable cores 52a and 52b, and the flapper valves 55a and 55b.

Each terminal of the coils 51a and 51b is electrically connected to a connector 59, and the connectors 59 of the respective valve assemblies 10 are connected to the wiring block 15. The wiring block 15 is connected to a control unit (not shown) by a connector cable(s), and a current(s) carried to the coils 51a and 51b of each of the valve assemblies 10 is controlled by a drive signal(s) from the control unit.

If the current is carried to the coil 51a, the pilot air-supply port PP is opened by the valve body 54a, and the pilot exhaust port PE is closed by the flapper valve 55a. Accordingly, the compressed air in the pilot air-supply port PP flows into the valve chamber 56a via the communication chamber 53a. The compressed air flowing into the valve chamber 56a is supplied to the pilot pressure chamber 34a via a communication flow path 60, and the spool valve shaft 38 is driven to the first position.

If the current is carried to the coil 51b, the pilot air-supply port PP is opened by the valve body 54b, and the pilot exhaust port PE is closed by the flapper valve 55b. Accordingly, the compressed air in the pilot air-supply port PP flows into the valve chamber 56b via the communication chamber 53b. The valve chamber 56b communicates with a pilot flow path 61 communicating with the pilot pressure chamber 33a, via a communication flow path 63 shown by a dash double-dotted line, and the compressed air flowing into the valve chamber 56b is supplied to the pilot pressure chamber 33a, and the spool valve shaft 38 is driven to the second position.

The manual operation block 35 is provided with a manual operation button 62, which moves the movable core 52a against a spring force and makes the valve body 54a forcibly open. The pilot pressure can be supplied to the pilot pressure chamber 34a by the manual operation button 62 without carrying any current to the coil 51a. The valve accommodation block 31 is provided with a pilot flow path 64 which communicates with the pilot pressure chamber 33a in parallel to the pilot flow path 61, and the pilot flow path 64 communicates with the pilot air-supply flow path 44 via a communication flow path 66. The manual operation block 32 is provided with a manual operation button 65 which operates, as shown in FIG. 3, the manual operation block 32 to a position of closing the pilot flow path 64 and opening the pilot flow path 61, and to a position of opening the pilot flow path 64 and closing the pilot flow path 61. The pilot pressure can be supplied to the pilot pressure chamber 33a by the manual operation button 65 without carrying any current to the coil 51b.

Figure 6:
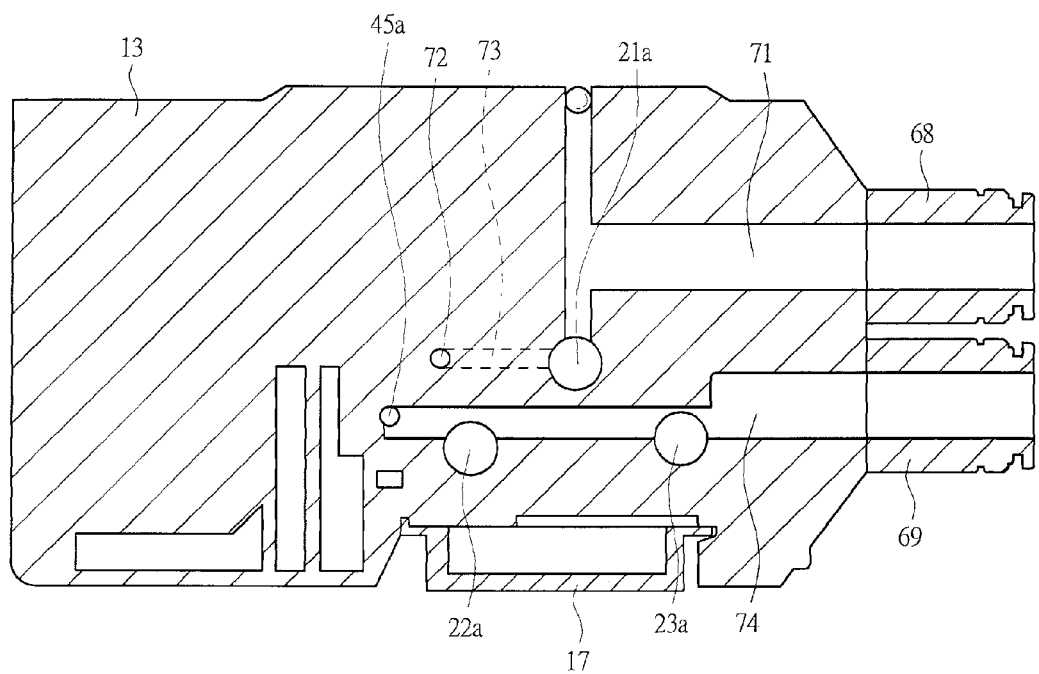
FIG. 6 is a sectional view taken along line 6-6 in FIG. 2A.
Figure 7:
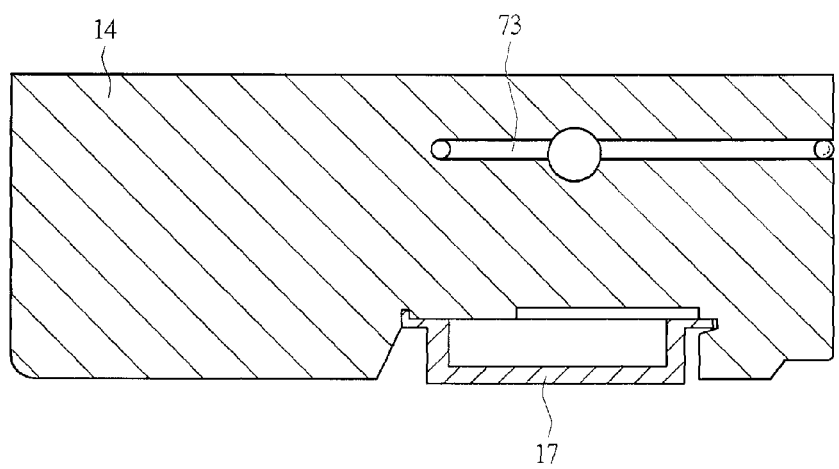
FIG. 7 is a sectional view taken along line 7-7 in FIG. 2A.
Figure 8A:
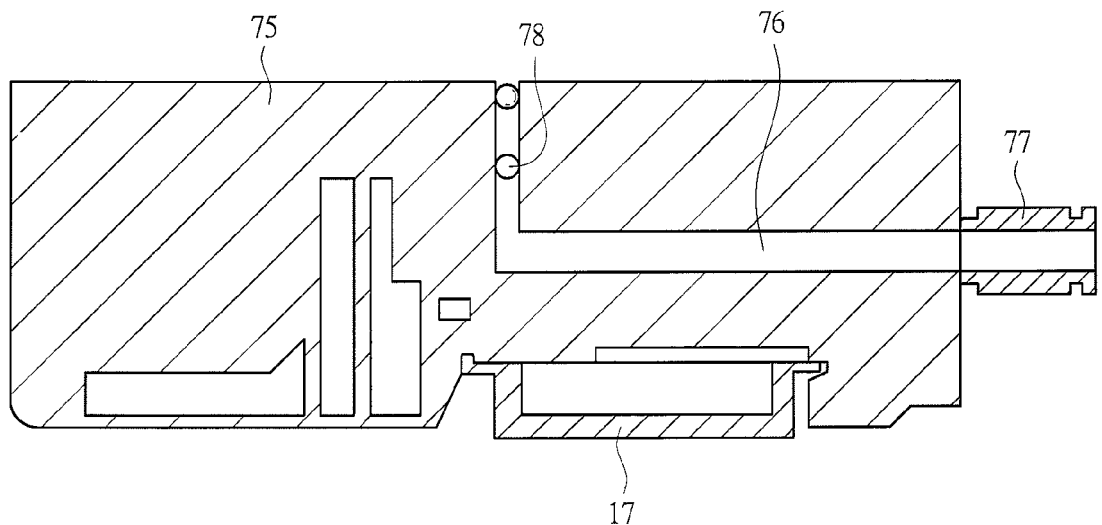
FIG. 8A is a sectional view taken along line 8A-8A in FIG. 2B.
Figure 8B:
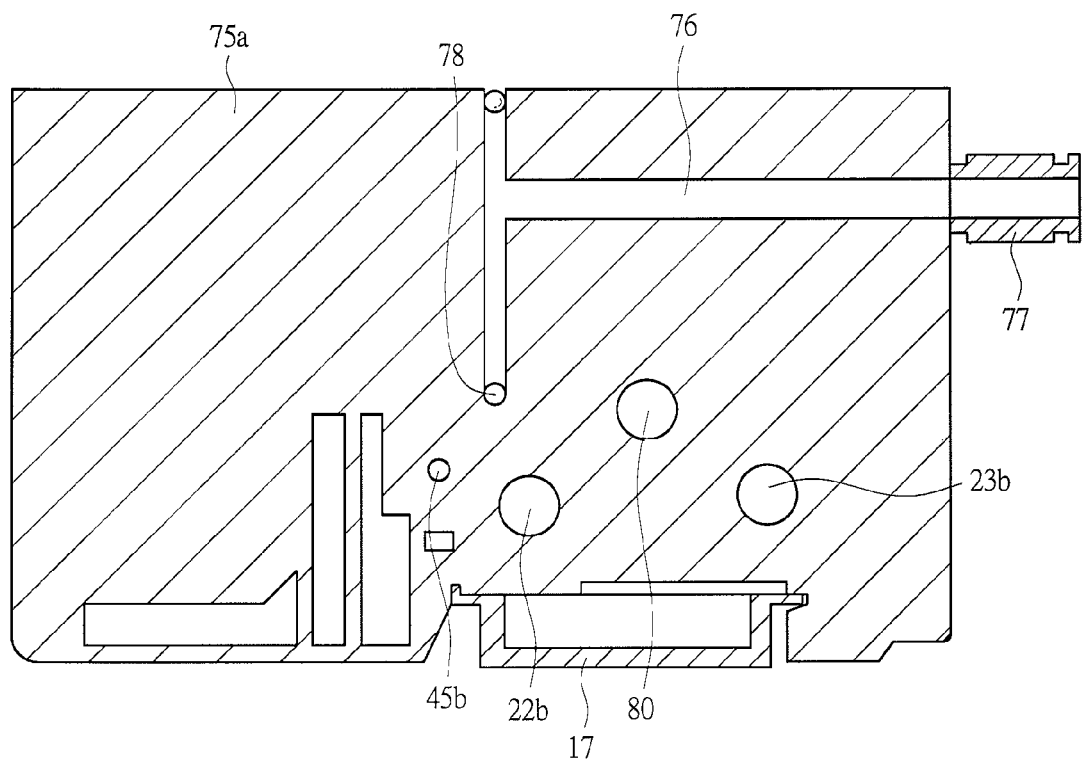
FIG. 8B is a sectional view of an external pilot block shown in FIG. 5C.

FIG. 5A is a sectional view schematically showing a main portion of FIG. 2A; FIG. 5B is a sectional view schematically showing a main portion of FIG. 2B; and FIG. 5C is a sectional view schematically showing a main portion of a modification of the manifold solenoid valve. FIG. 6 is a sectional view taken along line 6-6 in FIG. 2A; FIG. 7 is a sectional view taken along line 7-7 in FIG. 2A; FIG. 8A is a sectional view taken along line 8A-8A in FIG. 2B; and FIG. 8B is a sectional view of an external pilot block shown in FIG. 5C.

As shown in FIGS. 1 and 6, two joints 68 and 69 are attached to the air supply block 13 in parallel. A piping connected to a pneumatic pressure supply source having a compressor or the like is connected to the joint 68, and an exhaust pipe is connected to the joint 69. As shown in FIG. 1, the joints 68 and 69 are attached in the same surface as a joint connection side end surface of each base module 11 to which the joints 26 and 27 attached, and respective pipings or hoses connected to the joints are arranged concentrically on one side of the base 12.

A main flow path 71 communicating with the pneumatic pressure supply source is formed in the air supply block 13, has a through hole 21a passing through the air supply block 13 in its thickness direction, and communicates with the air-supply flow path 21 formed in the base 12 via the through hole 21a. An internal pilot flow path 72 communicating with the pilot air-supply flow path 44 formed in the base 12 is formed in the air supply block 13 so as to pass through the air supply block 13 in the thickness direction, and, as shown in FIG. 7, a communication flow path 73 causing the internal pilot flow path 72 and the main flow path 71 to communicate with each other is formed in the end block 14.

As shown in FIG. 6, formed in the air supply block 13 is an exhaust flow path 74 communicating with the exhaust flow paths 22 and 23 and the pilot exhaust flow path 45, which are formed in the base 12, via the communication holes 22a, 23a and 45a. Air exhausted to the exhaust flow path 74 is guided to the outside via an exhaust pipe connected to the joint 69.

As shown in FIG. 5A, when an inner surface 13a of the air supply block 13 is connected to the end surface of the base 12 and when the end block 14 is connected to the outer surface 13b of the air supply block 13, the main flow path 71 communicates with the air-supply flow path 21 and simultaneously communicates with the pilot air-supply flow path 44 via the communication flow path 73 and the internal pilot flow path 72. For this reason, a part of the compressed air supplied to the air-supply flow path 21 from the main flow path 71 is branched and supplied to the pilot air-supply flow path 44. The manifold solenoid valve shown in FIG. 2A becomes an internal pilot type in which pilot pressure is supplied to the pilot solenoid valves 58a and 58b of each of the valve assemblies 10 from the main flow path 71. As mentioned above, the internal pilot type of the manifold solenoid valve is used as a standard specification.

As shown in FIG. 5B, an external pilot block 75 is intended to be detachably connected between the air supply block 13 and the end block 14. An inner surface of the external pilot block 75 is connected (struck) to the outer surface 13b of the air supply block 13 serving as a mounting surface, and an inner surface of the end block 14 is connected to an outer surface of the external pilot block 75, whereby the external pilot block 75 is added on to the manifold solenoid valve.

As shown in FIG. 8A, formed in the external pilot block 75 is an external pilot flow path 76 communicating with the pilot air-supply flow path 44 via the internal pilot flow path 72 of the air supply block 13, and a joint 77 communicating with the external pilot flow path 76 is attached to the external pilot block 75. The external pilot flow path 76 has a communication hole 78 corresponding to the pilot air-supply flow path 44, and this communication hole 78 is formed by embedding a seal member 79 in a through hole which is formed in the external pilot block 75 so as to penetrate through the external pilot block 75 in the thickness direction. The seal member 79 is selectively detachably connected to one of both inner and outer sides of an opening end portion of the through hole, and when the external pilot block 75 is disposed on a right side of the base 12 in FIG. 2B, the seal member 79 is connected to the opening end portion located at an outer-surface side of the external pilot block 75.

When the external pilot block 75 is connected to the outer surface 13b serving as the mounting surface of the air supply block 13, communication between the main flow path 71 of the air supply block 13 and the pilot air-supply flow path 44 is shut off. If the external pilot block 75 is added on as shown in FIG. 5B, the air-supply flow path 21 communicates with the main flow path 71, and the pilot air-supply flow path 44 communicates with the external pilot flow path 76 via the internal pilot flow path 72. Accordingly, the manifold solenoid valve shown in FIG. 2B becomes an external pilot type in which pilot pressure is supplied to the pilot solenoid valves 58a and 58b of each of the valve assemblies 10 from the external pilot flow path 76. As described above, if the external pilot block 75 is added on to the manifold solenoid valve in which the internal pilot type is used as the standard specification, the manifold solenoid valve becomes the external pilot type.

Incidentally, instead of forming, as shown in FIGS. 5A to 5C, the communication flow path 73 inside the end block 14, the communication flow path 73 may be formed between the inner surface of the end block 14 and the outer surface 13b of the air supply block 13 by forming a concave groove in the inner surface of the end block 14.

As mentioned above, since the external pilot block 75 is added on between the air supply block 13 and the end block 14 in the internal pilot type manifold solenoid valve, the communication between the main flow path 71 and the pilot air-supply flow path 44 is shut off, and simultaneously the internal pilot type is set to be switched to the external pilot type in which pilot pressure is supplied directly to the pilot air-supply flow path 44 from the outside via the external pilot flow path 76. Accordingly, by adding on the external pilot block 75 to the internal pilot type manifold solenoid valve, the manifold solenoid valve (pilot solenoid valve) can be easily set to the external pilot type. On the contrary, by detaching the external pilot block 75 from the external pilot type manifold solenoid valve, the pilot solenoid valve can be set to the internal pilot type. As mentioned above, since the standard specification of the manifold solenoid valve is the internal pilot type, if the external pilot block 75 is prepared, the manifold solenoid valve can be set to any of the internal and external pilot types by using a less number of parts. Incidentally, by providing the external pilot block 75 with a flow path(s) that communicates with the pilot exhaust flow path 45, pilot pressure may be exhausted from the external pilot block 75.

FIGS. 5C and 8B each show a modification of the external pilot type. An external pilot block 75a is intended to be disposed between the base 12 and the air supply block 13. Accordingly, as shown in FIG. 8B, communication holes 22b and 23b are formed in the external pilot block 75a so as to cause the communication holes 22a and 23a of the air supply block 13 and the exhaust passages 22 and 23 of the base 12 to communicate with one another, and further a communication flow path 45b is formed in the external pilot block 75a so as to cause the pilot exhaust flow path 45a of the air supply block 13 and the pilot exhaust flow path 45 of the base 12 to communicate with each other.

The external pilot block 75a is connected to the end surface of the base 12, and the inner surface 13a of the air supply block 13, which serves as a mounting surface, is connected to the external surface of the external pilot block 75a, whereby the external pilot block 75a is added on to the manifold solenoid valve, and the end block 14 is connected to the outer surface 13b of the air supply block 13. Since a through hole 80 is formed, as shown in FIG. 8B, in the external pilot block 75a correspondingly to the through hole 21a of the air supply block 13, when the external pilot block 75a is disposed between the base 12 and the air supply block 13, the main flow path 71 communicates, as shown in FIG. 5C, with the air-supply flow path 21 via the through hole 80. Further, the communication between the main flow path 71 and the pilot air-supply flow path 44 is shut off by the seal member 79, and the pilot air-supply flow path 44 becomes in a state of communicating with the external pilot flow path 76.

As mentioned above, by using the external pilot block 75 shown in FIG. 8A, the manifold solenoid valve is set, as shown in FIG. 5B, to a type in which the air supply block 13 is incorporated between the base 12 and the external pilot block 75. Also, by using the external pilot block 75a shown in FIG. 8B, the manifold solenoid valve is set, as shown in FIG. 5C, to a type in which the external pilot block 75a is incorporated between the base 12 and the air supply block 13. Incidentally, the external pilot block 75a shown in FIG. 8B is used also in the external pilot type in which the air supply block 13 is incorporated, as shown in FIG. 5B, between the base 12 and the external pilot block 75. Therefore, by using the single external pilot block 75a, the manifold solenoid valve can be set also to any of the above types. Even if the through hole 80 is formed in the pilot block 75 shown in FIGS. 5B and 8A similarly to that of the external pilot block 75a shown in FIGS. 5C and 8B, since the seal member 79 is provided in the external pilot block 75, the communication between the main flow path 71 and the internal pilot flow path 72 is shut off.

FIGS. 9A to 9C are sectional views schematically showing main portions of modifications of the manifold solenoid valve shown in FIG. 2. The air supply block 13 in this manifold solenoid valve is disposed on a left side of the base 12 while the air supply block 13 in the above-mentioned manifold solenoid valve is disposed on a right side of the base 12 shown in FIG. 1. As mentioned above, the air supply block 13 can be disposed on any of both end portion sides of the base 12.

FIG. 9A shows a manifold solenoid valve which is set to the internal pilot type similarly to that shown in FIG. 5A, and the air supply block 13 is disposed in a state of being sandwiched between the base 12 and the end block 14. FIG. 9B shows a manifold solenoid valve set to the external pilot type by connecting the external pilot block 75 to the outer surface 13b of the air supply block 13, which is connected to the end surface of the base 12, similarly to that shown in FIG. 5B. If the external pilot block 75 shown in FIG. 5B is disposed, as shown in FIG. 9B, opposite the base 12 without any change, the seal member 79 is disposed on an inner surface side of the external pilot block 75. Accordingly, the same external pilot block 75 can be disposed even at any of the both end portions of the base 12 by changing the seal member 79 from a position of the opening end portion of the through hole shown in FIG. 5B to a position shown in FIG. 9B.

FIG. 9C shows a manifold solenoid valve which is set, similarly to that shown in FIG. 5C, to the external pilot type by connecting the external pilot block 75a to the end surface of the base 12 and connecting the inner surface 13a of the air supply block 13 to the outer surface of the external pilot block 75a. Even in this case, the mounting position of the seal member 79 with respect to the through hole for forming the communication hole 78 is changed from one of the opening end portion shown in FIG. 5C to the other thereof.

As mentioned above, the air supply block 13 is disposed at any of the end surfaces located on the right and left sides of the base 12 without changing respective basic structures of the air supply block 13, the end block 14, and the external pilot blocks 75 and 75a. However, since the position of the seal member 79 for forming the communication hole 78 of the external pilot blocks 75 and 75a is symmetrical to and opposite those of the external pilot blocks 75 and 75a shown in FIG. 5, if the air supply block 13 is disposed only on one of the right and left sides of the base 12, the communication hole 78 can be formed as a bottomed hole without using the seal member 79.

Figure 10:
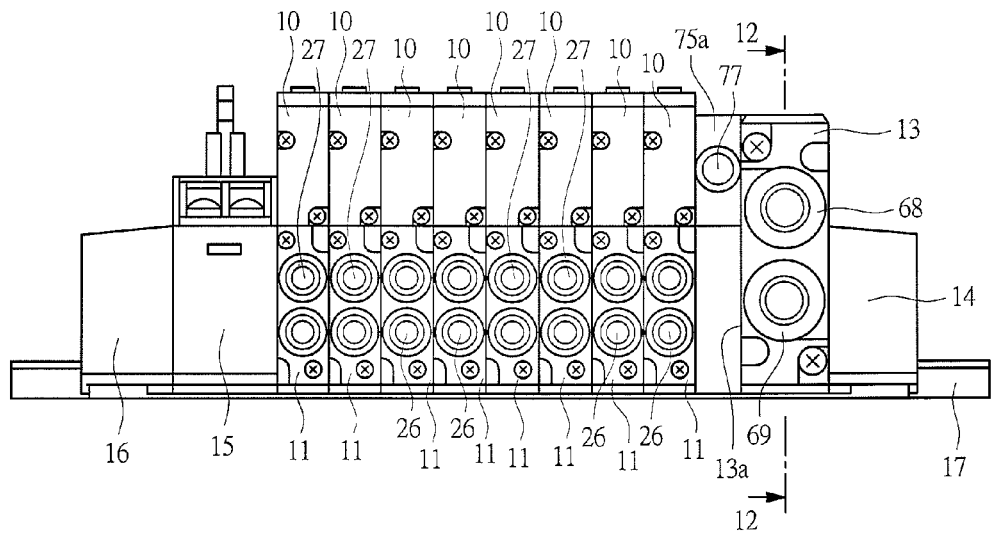
FIG. 10 is a front view showing a manifold solenoid valve according to another embodiment in a state of being switched to an external pilot type.
Figure 11A:
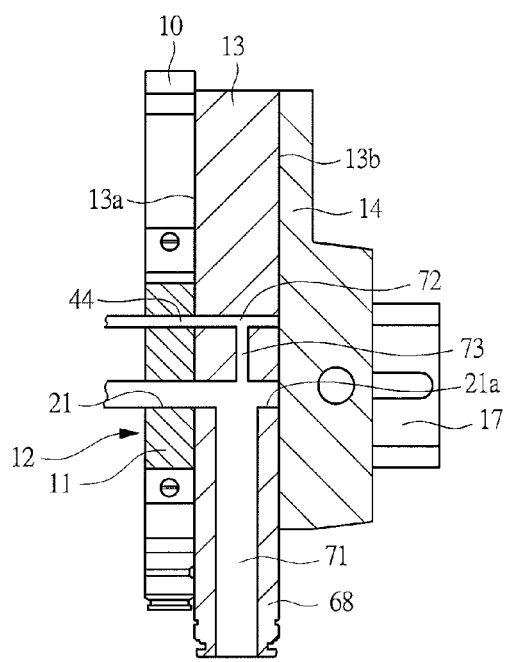
FIG. 11A is a sectional view schematically showing a main portion of the manifold solenoid valve in FIG. 10 in a state of being switched to an internal pilot type.
Figure 11B:
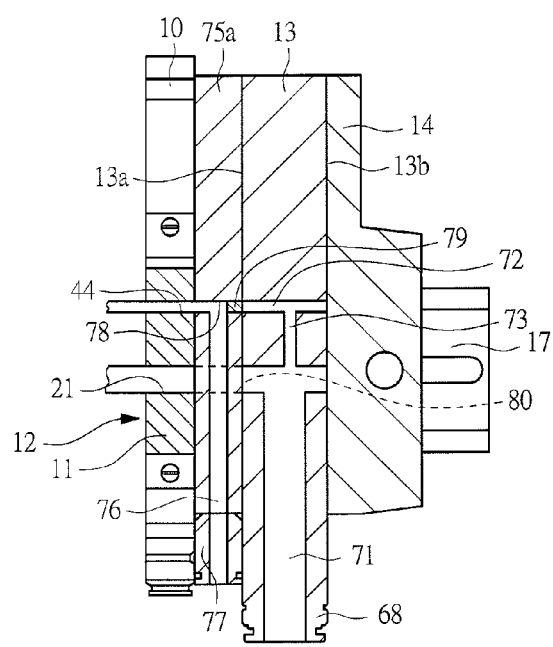
FIG. 11B is a sectional view schematically showing a main portion of the manifold solenoid valve in FIG. 10 in a state of being switched to the external pilot type.
Figure 12:
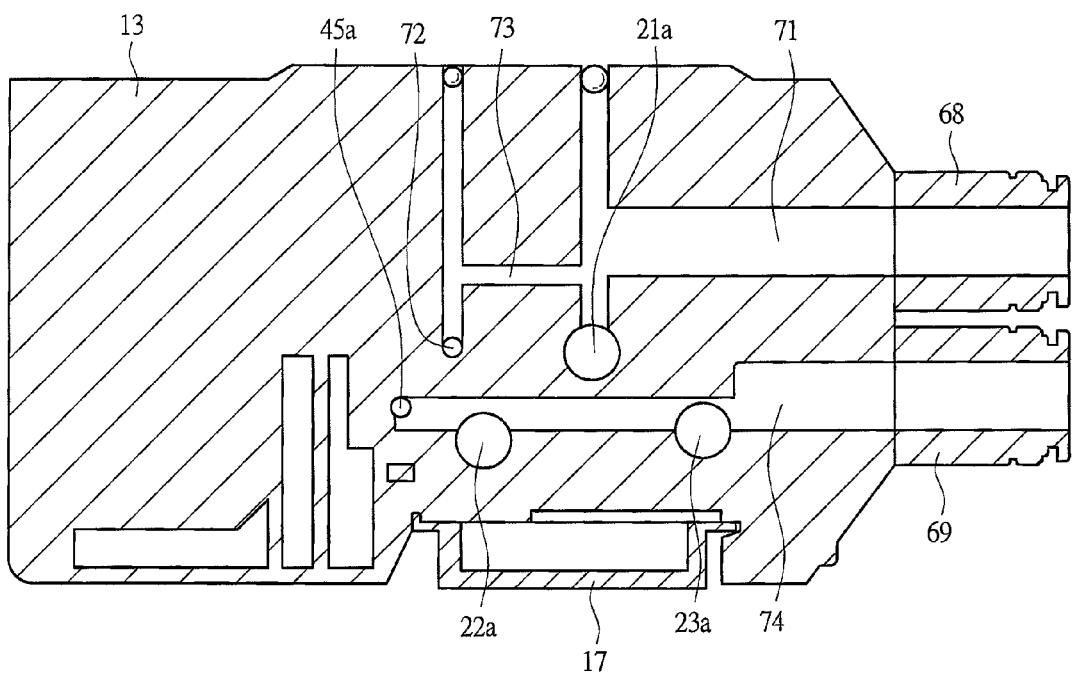
FIG. 12 is a sectional view taken along line 12-12 in FIG. 10.

FIG. 10 is a front view showing a manifold solenoid valve according to another embodiment in a state of being switched to an external pilot type; FIG. 11A is a sectional view schematically showing a main portion of the manifold solenoid valve in FIG. 10 in a state of being switched to an internal pilot type; FIG. 11B is a sectional view schematically showing a main portion of the manifold solenoid valve in FIG. 10 in a state of being switched to an external pilot type; and FIG. 12 is a sectional view taken along line 12-12 in FIG. 10. Incidentally, in these drawings, the same reference numerals denote members common to those of the manifold solenoid valve as mentioned above.

As shown in FIGS. 11A and 11B, formed in the air supply block 13 is a communication flow path 73 which causes the main flow path 71 communicating with the air-supply flow path 21 and the internal pilot flow path 72 communicating with the pilot air-supply flow path 44 to communicate with each other. Accordingly, compressed air is supplied to the pilot air-supply flow path 44 via the communication flow path 73 formed in the end block 14 in FIGS. 5A and 9A, whereas if the manifold solenoid valve is set, as shown in FIG. 11A, to the internal pilot type, part of the compressed air supplied to the air-supply flow path 21 from the joint 68 is supplied directly to the pilot air-supply flow path 44 without interposing the end block 14.

The external pilot block 75a is intended to be disposed between the base 12 and the air supply block 13, and has the same structure as that of the external pilot block 75a shown in FIG. 8B. When the manifold solenoid valve is set to the internal pilot type as shown in FIG. 11A, the inner surface 13a of the air supply block 13 is connected directly to the end surface of the base 12, and when the manifold solenoid valve is set to the external pilot type as shown in FIG. 11B, the inner surface 13a of the air supply block 13 becomes connected to the outer surface of the external pilot block 75a, whereby the external pilot block 75a and the air supply block 13 are arranged in the end portion of the base 12. Similarly to the case shown in FIG. 5C, the external pilot flow path 76 formed in the external pilot block 75a is intended to communicate directly with the pilot air-supply flow path 44 of the base 12, and the through hole 80 causing the air-supply flow path 21 and the main flow path 71 to communicate with each other is formed, as shown in FIG. 8B, in the external pilot block 75a.

As shown in FIG. 11A, when the inner surface 13a of the air supply block 13 becomes connected to the end surface of the base 12 and the end block 14 becomes connected to the outer surface 13b of the air supply block 13, the manifold solenoid valve becomes the internal pilot type as the standard specification. If the manifold solenoid valve is set to the internal pilot type, compressed air supplied to the main flow path 71 is supplied to the air-supply flow path 21, and part thereof is supplied to the pilot air-supply flow path 44 via the internal pilot flow path 72.

On the other hand, as shown in FIGS. 10 and 11B, if the external pilot block 75a is added on between the base 12 and the air supply block 13, the inner surface of the external pilot block 75a is connected to the end surface of the base 12, and the inner surface 13a of the air supply block 13 is connected to the outer surface thereof, then the manifold solenoid valve is set to the external pilot type. Under this state, communication between the main flow path 71 and the pilot air-supply flow path 44 is shut off by the seal member 79 for forming the communication hole 78. Since the main flow path 71 communicates with the air-supply flow path 21 via the through hole 80, the compressed air is supplied to the air-supply flow path 21 from the main flow path 71 of the air supply block 13. Further, since the communication between the main flow path 71 and the pilot air-supply flow path 44 is shut off by the seal member 79, pilot pressure is supplied to the pilot air-supply flow path 44 from the external pilot flow path 76 of the external pilot block 75a.

As mentioned above, by adding on the external pilot block 75a between the air supply block 13 and the base 12 of the internal pilot type manifold solenoid valve, the communication between the main flow path 71 and the pilot air-supply flow path 44 is shut off, and the manifold solenoid valve is set to the external pilot type in which the pilot pressure is supplied directly to the pilot air-supply flow path 44 from the outside via the external pilot flow path 76. Accordingly, by adding on the external pilot block 75a to the internal pilot type manifold solenoid valve, the manifold solenoid valve is easily set to the external pilot type, so that by using the internal pilot type as the standard specification and by preparing the external pilot block 75a, use of a less number of parts permits the manifold solenoid valve to be set to any of the internal and external pilot types.

As shown in FIGS. 11A and 11B, if the air supply block 13 is provided with the communication flow path 73 causing the internal pilot flow path 72 and the main flow path 71 to communicate with each other, as shown in FIGS. 5A to 5C, it is not necessary to form the communication flow path 73 in the end block 14. Incidentally, the internal pilot flow paths 72 formed in the air supply blocks 13 are opened, as shown in FIGS. 11A and 11B, to the outer surfaces 13b of the air supply blocks 13, and the through holes 21a are also opened to the outer surfaces 13b, but each side of the outer surfaces 13b may be closed.

FIGS. 13A and 13B are sectional views schematically showing main portions of a modification of the manifold solenoid valve shown in FIG. 10. The air supply block 13 is disposed on the right side of the base 12 in the manifold solenoid valve shown in FIG. 10, whereas the air supply block 13 is disposed on the left side of the base 12 in this manifold solenoid valve. FIG. 13A shows the manifold solenoid valve set to the internal pilot type similarly to that shown in FIG. 11A, and the air supply block 13 is disposed in a state of being sandwiched between the base 12 and the end block 14. FIG. 13B shows a manifold solenoid valve which is set, similarly to that shown in FIG. 11B, to the external pilot type by connecting the external pilot block 75a to the end surface of the base 12 and by connecting the inner surface 13a of the air supply block 13 to the outer surface of the external pilot block 75.

As mentioned above, the air supply block 13 can be disposed at any of the end surfaces located on the right and left sides of the base 12 without changing respective basic structures of the air supply block 13, the end block 14, and the external pilot block 75a. However, the position of the seal member 79 for forming the communication hole 78 of the external pilot block 75a becomes symmetrical to and opposite the external pilot block 75a shown in FIGS. 11B and 13B. Accordingly, if the air supply block 13 is disposed only on one of the right and left sides of the base 12, the communication hole 78 can be formed as a bottomed hole without using the seal member 79.

The present invention is not limited to the above-mentioned embodiments, and can be variously modified within a scope of not departing from the gist of the invention. For example, the two pilot solenoid valves 58a and 58b are arranged in parallel and on one of the end portion sides (on the left side in FIG. 3) of the valve accommodation block 31, but the two pilot solenoid valves may be arranged on both end sides of the valve accommodation block 31. The valve assembly 10 is a double solenoid type in which two pilot solenoid valves are provided, but may be a single solenoid type in which one pilot solenoid valve is provided. An indirect actuating type valve having the spool valve shaft 38 is a five-port and two-position type of having five ports and two switch positions, but the present invention can be applied also to a manifold solenoid valve of a three-position type of having three or five ports.

What is claimed is:

1. A manifold solenoid valve having a plurality of valve assemblies, each of which has a spool valve shaft and a pilot solenoid valve, the spool valve shaft being movable to a position of causing an air supply port to communicate with an output port and a position of causing the output port to communicate with an exhaust port, the pilot solenoid valve being switched to a position of supplying pilot pressure to the spool valve shaft and a position of stopping supplying the pilot pressure to the spool valve shaft, the manifold solenoid valve comprising:

a base on which the valve assemblies are mounted and in which a common air-supply flow path communicating with the air supply port, a common exhaust flow path communicating with the exhaust port, and a common pilot air-supply flow path supplying the pilot pressure to the pilot solenoid valve are formed, the base being detachably connected to a support member;

an air supply block in which a main flow path communicating with the air-supply flow path, and an internal pilot flow path communicating with the pilot air-supply flow path are formed, the air supply block being disposed on one side of the base and detachably connected to the support member; and an end block which is disposed on an outer surface side of the air supply block and detachably connected to the support member, and which fixes the base and the air supply block to the support member, wherein the manifold solenoid valve is set to an internal pilot type of supplying the pilot pressure to the pilot air-supply flow path from the main flow path by connecting the end block to the air supply block connected to the base, and the manifold solenoid valve is set to an external pilot type of supplying the pilot pressure to the pilot air-supply flow path from an external pilot flow path formed in an external pilot block, the external pilot flow path communicating with the pilot air-supply flow path, the external pilot block shutting off communication between the pilot air-supply flow path and the main flow path, by adding the external pilot block between the base and the air supply block, or between the air supply block and the end block.

2. The manifold solenoid valve according to claim 1, wherein when the manifold solenoid valve is set to the external pilot type, the external pilot block formed with a communication hole causing the external pilot flow path and the pilot air-supply flow path to communicate with each other is disposed between the end block and the air supply block connected to the base, and the pilot solenoid valve supplies the pilot pressure to the pilot air-supply flow path from the external pilot flow path of the external pilot block, when the manifold solenoid valve is set to the internal pilot type, the pilot solenoid valve supplies the pilot pressure from the main flow path to the pilot supply flow path via a communication flow path formed in the end block.

3. The manifold solenoid valve according to claim 1, wherein when the manifold solenoid valve is set to the external pilot type, the external pilot block formed with a communication hole causing the external pilot flow path and the pilot air-supply flow path to communicate with each other, and a through hole causing the main flow path and the air-supply flow path to communicate with each other is disposed between the base and the air supply block, and the pilot solenoid valve supplies the pilot pressure to the pilot air-supply flow path from the external pilot flow path of the external pilot block, when the manifold solenoid valve is set to the internal pilot type, the pilot solenoid valve supplies the pilot pressure from the main flow path to the pilot supply flow path via a communication flow path formed in the end block.

4. The manifold solenoid valve according to claim 1, wherein when the manifold solenoid valve is set to the external pilot type, the external pilot block formed with a communication hole causing the external pilot flow path and the pilot air-supply flow path to communicate with each other, and a through hole causing the main flow path and the air-supply flow path to communicate with each other is disposed between the base and the air supply block, and the pilot solenoid valve supplies the pilot pressure to the pilot air-supply flow path from the external pilot flow path of the external pilot block, when the manifold solenoid valve is set to the internal pilot type, the pilot solenoid valve supplies the pilot pressure from the main flow path to the pilot supply flow path via a communication flow path formed in the air supply block to cause the main flow path and the internal pilot flow path to communicate with each other.

5. The manifold solenoid valve according to claim 2, wherein the communication hole is formed by a through hole formed in the external pilot block correspondingly to the pilot air-supply flow path so as to be opened to both surfaces of the external pilot block, and by a seal member selectively detachably connected to one of both opening end portions of the through hole so as to close the one opening end portion of the through hole, and the external pilot block is permitted to be disposed at any of both end portions of the base by changing a mounting position of the seal member.

6. The manifold solenoid valve according to claim 3, wherein the communication hole is formed by a through hole formed in the external pilot block correspondingly to the pilot air-supply flow path so as to be opened to both surfaces of the external pilot block, and by a seal member selectively detachably connected to one of both opening end portions of the through hole so as to close the one opening end portion of the through hole, and the external pilot block is permitted to be disposed at any of both end portions of the base by changing a mounting position of the seal member.

7. The manifold solenoid valve according to claim 4, wherein the communication hole is formed by a through hole formed in the external pilot block correspondingly to the pilot air-supply flow path so as to be opened to both surfaces of the external pilot block, and by a seal member selectively detachably connected to one of both opening end portions of the through hole so as to close the one opening end portion of the through hole, and the external pilot block is permitted to be disposed at any of both end portions of the base by changing a mounting position of the seal member.

* * * * *